United States Patent

Burkhart et al.

[11] Patent Number: 6,166,098
[45] Date of Patent: Dec. 26, 2000

[54] USE OF ORGANOFUNCTIONALLY MODIFIED POLYSILOXANES IN THE PRODUCTION OF POLYURETHANE FOAM

[75] Inventors: Georg Burkhart; Andreas Weier, both of Essen, Germany

[73] Assignee: Goldschmidt AG, Essen, Germany

[21] Appl. No.: 09/506,280

[22] Filed: Feb. 17, 2000

[30] Foreign Application Priority Data

Feb. 20, 1999 [DE] Germany .............. 199 07 322

[51] Int. Cl.[7] .............. C08J 9/00; C08G 18/61
[52] U.S. Cl. ........................ 521/112; 521/154
[58] Field of Search ............................ 521/112, 154

[56] References Cited

U.S. PATENT DOCUMENTS 2,846,458  8/1958  Haluska .
3,115,512  12/1963  Altendorf et al. .

FOREIGN PATENT DOCUMENTS

| 0 275 563 A1 | 7/1988 | European Pat. Off. . |
| 1 012 602 | 1/1958 | Germany . |
| 1 040 251 | 10/1958 | Germany . |
| 1 120 147 | 12/1961 | Germany . |
| 1 153 166 | 8/1963 | Germany . |
| 1 220 615 | 7/1966 | Germany . |
| 1 694 366 | 11/1970 | Germany . |
| 1 570 647 | 2/1971 | Germany . |

*Primary Examiner*—Morton Foelak
*Attorney, Agent, or Firm*—Frommer Lawrence & Haug LLP

[57] ABSTRACT

The invention provides for a composition comprising a mixture of Si—C- and Si—O—C- linked silicone polyether block copolymers and the use of said compositions as an additive in the production of polyurethane foams.

4 Claims, No Drawings

USE OF ORGANOFUNCTIONALLY MODIFIED POLYSILOXANES IN THE PRODUCTION OF POLYURETHANE FOAM

RELATED APPLICATIONS

This application claims priority to German application No. 199 07 322.8, filed on Feb. 20, 1999, herein incorporated by reference.

BACKGROUND OF THE INVENTION

1. Field of the Invention

The invention relates to compositions comprising mixtures of polysiloxane-polyoxyalkylene copolymers containing modified polyoxyalkylene building blocks and to the use of these compositions, as stabilizers, in the production of polyurethane foams.

Polysiloxane-polyoxyalkylene block copolymers are used in the production of polyurethane foams. They make possible the formation of a uniform pore structure and stabilize the foam during the production process.

Not all polysiloxane-polyoxyalkylene block copolymers can be used for this application. Their ability to be used is influenced by the equilibrium between the polysiloxane blocks and the polyoxyalkylene blocks in the copolymer, which has to be set with precision. The structure of the two blocks is therefore of great importance. The structures of the blocks can be varied using a large number of parameters.

The composition of the polyoxyalkylene block can be altered in terms of the oxyalkylene units present; particular examples are oxyethylene, oxypropylene and oxybutylene. By composition in this context is meant not only the relative number but also the arrangement of the oxyalkylene units. Furthermore, the molecular weight and the end group of the polyoxyalkylene block can be varied. Linkage between the polyoxyalkylene block and the polysiloxane can be by way of a hydrolysis-stable Si—C bond or a less hydrolysis-stable Si—O—C bond.

The polysiloxane can be altered in terms of the number of siloxane units, the branching, and the number of linkage possibilities to the polyoxyalklene.

The effectiveness of a polysiloxane-polyoxyalkylene copolymer in foam stabilization can be predicted only to a very limited extent. The expertise in this field therefore lies in an empirical study of the effects of the possible structural alterations.

2. Description of the Related Art

Polysiloxane-polyoxyalkylene block copolymers are described in numerous publications. The following citations therefore represent only a selection.

DE-A-15 70 647 is concerned with the Si—O—C linkage of chloropolysiloxanes to polyoxyalkylene units of which from 40 to 70% have molecular weights of from 1000 to 3000, preferably having secondary OH groups, and up to 50 OH equivalent percent have a molecular weight of from 130 to 3500, and whose structure consists of ethylene oxide and/or propylene oxide. Preference is given to a molecular weight of up to 1750.

DE-A-16 94 366 relates to the use of polysiloxane-polyoxyalkylene copolymers having the following structure as foam stabilizers:

from 25 to 70% of the weight consist of a polyoxyalkylene having an average molecular weight of from 1600 to 4000, with an ethylene oxide content of from 20 to 100% by weight, the other monomer, if present, being propylene oxide or, optionally, higher alkylene oxides, and from 30 to 75% by weight of a polyoxyalkylene having an average molecular weight of from 400 to 1200, with an ethylene oxide content of from 65 to 100% by weight, the other monomer, if present, being propylene oxide or, optionally, higher alkylene oxides.

EP-A-0 275 563 describes a block copolymer which is built up of three different polyoxyalkylene units. One block contains from 20 to 60% by weight of oxyethylene units and has a molecular weight of from 3000 to 5500; a further block contains from 20 to 60% by weight of oxyethylene units, with a molecular weight of from 800 to 2900; and a third block consists only of polyoxypropylene and has a molecular weight of from 130 to 1200.

Despite the large number of siloxane-polyether block copolymers which are thus obtainable, the large number of fields of use for these active substances—for example, as additives for both solventborne and low-solvent coating materials, inks and pastes, for coating textiles and paper (tissues), as a starting material for crosslinking reactions, as antifoams, as emulsifiers, as additives to cosmetic preparations, as stabilizers for the wide field of PU foam production (firstly owing to the large number of possible type of polyurethane foam, such as flexible foam, rigid foam, ester foam, cold foam, packaging foam, flame-laminatable foam, molding foam, integral foam, etc., secondly owing to new techniques of foaming, such as variable pressure foaming, foaming with pressurized inert gases, or else forced cooling processes, e.g., Enviro-cure, Crain Industries)—makes it necessary to look for further-improved structures.

Apart from the large number of possible combinations of various siloxane chains with different degrees of modification and different sites of modification with polyether side chains of various molecular weight, EO-PO ratio, different end groups, possibly also in combination with other modifying groups on the siloxane, a fundamental difference between stabilizers used is the nature of the preparation of the corresponding polyether-modified siloxanes. Generally, two routes are described:

First, the synthesis of the hydrolysis-stable Si—C bond by means of a hydrosilylation reaction between a siloxane containing SiH groups and an olefinically substituted polyether, or the synthesis of a less hydrolysis-stable Si—O—C bond by means of the linking of chloro-substituted siloxanes to hydroxyl-functional polyethers. The attachment of substituents to a polysiloxane can be performed by two different kinds of chemical reaction. By hydrolysis of chlorosiloxanes with polyethers, with elimination of hydrogen chloride, an Si—O—C bond is formed. The preparation of these compounds can be found in German Patents 10 12 602, 10 40 251 and 11 20 147 and in U.S. Pat. No. 3,115,512.

The second possibility is the so-called hydrosilylation reaction in which the radicals $R^3$ and $R^4$ are introduced onto the molecule of the polysiloxane by an addition reaction onto SiH groups of the polysiloxane in the presence of a hydrosilylation catalyst, with the formation of an Si—C bond. According to the prior art, platinum catalysts, such as, for example, cis-dichlorodiammineplatinum(II) or hexa-chloroplatinic(IV) acid, are used for this second possibility, which is described in U.S. Pat. No. 2,846,458 and in the German Laid-open and Examined Documents 12 20 615 and 11 53 166.

In the preparation of polyurethanes, these substances are usually used as uniform substances or else as a mixture of silicone polyether copolymers of the same preparation type.

In some cases (in ester foam, for example) the silicone-polyether copolymers used are also combined with other surface-active substances in order, for example, to improve the emulsion effect of the additives.

It has surprisingly now been found that the mixing of different silicone polyether copolymer types, i.e., the use of both Si—C- and Si—O—C-linked silicone polyether block copolymers in one mixture, permits particular combinations of properties. Particularly noteworthy in this context is the possible combination of activity and cell fineness.

SUMMARY OF THE INVENTION

The present invention deals accordingly with compositions comprising both Si—C and Si—O—C linked silicone block copolymers and the use of improved polysiloxane-polyoxyalkylene block copolymers as additives in the production of polyurethane foams.

The inventive compositions comprise a mixture of at least two block copolymers of the general formula I

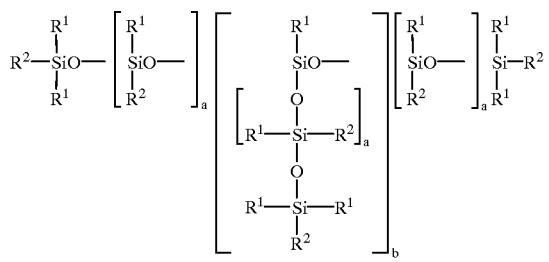

in which the radicals $R^1$ are alkyl radicals or aryl radicals, $R^2$ are $R^1$ and/or $R^3$ and/or $R^4$ wherein at least one $R^2$ is not $R^1$, $R^3$ is a polyether radical of the formula II
—$(Y)_e[O(C_2H_{4-d}R'_dO)_m(C_xH_{2x}O)_pZ]_w$, with the proviso that
e=0 or 1,
w=1 to 4,
d=1 to 3,
m≧1,
x=2 to 4, obtainable by using $C_2H_4O$, $C_3H_6O$ and $C_4H_8O$ units either individually or in combination, and
p≧1, and
Y is a (w+1)-valent hydrocarbon radical, which can also be branched,
R' is selected from the group consisting of monovalent aromatic or nonaromatic hydrocarbon radicals from $C_3$ to $C_{18}$,
Z is hydrogen or a monovalent organic radical, the sum m+p=1 to 150, $R^4$ is a polyether radical of the formula III
—$(F)_f[O(C_xH_{2x}O)_rZ]_g$, with the proviso that
f=0 or 1,
x=2 to 4, obtainable by using $C_2H_4O$, $C_3H_6O$ and $C_4H_8O$ units either individually or in combination,
g=1 to 4 and
r≧1,
F is a (g+1)-valent hydrocarbon radical, which can also be branched, a is a number from 1 to 100 if b is a number from 6 to 8,
a is a number from 1 to 200 if b is a number from 3 to 6,
a is a number from 1 to 300 if b is a number from 0 to 3,
b=0 to 8,
subject to the condition that in at least one of the silicone copolymer components of the mixture both e and f are 1 and in at least one of the silicone components of the mixture either e or f is 0.

The present invention also provides for stabilizers to be used in the production of polyurethane foams which comprise a mixture of at least two of the block copolymers of formula I, as well as a process for preparing polyurethane foams which comprises adding said stabilizer.

An important feature of the present invention lies in particular in the use of combinations of organofunctionally modified polysiloxanes.

As shown by the examples below, which serve for illustration but are not intended to represent any restriction whatsoever, the activities of the additive in connection, for example, with the production of flexible polyurethane foams consist in avoiding foam collapse and in optimizing the attainment of low densities. Furthermore, polysiloxane combinations put together in accordance with the claim are able to bring about a significant increase, for example, in cell fineness when used in polyurethane foam formulations, such as in the process using liquid inert gases as blowing agents.

EXAMPLES

As is well known to the person skilled in the art, both the average molecular weights of the siloxane chains and the polyethers used are heavily dependent on the type of foam to be stabilized. For flexible foam, for example, regardless of whether with (see EP-A-0 645 226) or without the use of pressurized gases as blowing agents, siloxane chain lengths of between 40 and 200, and fairly long-chain polyethers (MW up to 4000 g/mol) have been found to be favorable. The rigid foam application requires shorter siloxane chains (<50 $SiR_2O$ units) and polyether chains (<1500 g/mol). Such different stabilizer molecular weights do not allow any general statement as to the minimum effective chain length or the minimum effective polyether molecular weight. Whereas, accordingly, a combination of Si—C-modified siloxanes with Si—O—C-modified siloxanes shows significant improvements in cold-cure foam even in the case of small molecules, combinations of copolymers of higher molecular mass are effective in the case of flexible foam.

For the purpose of assessing the effectiveness of combinations of additives in accordance with the invention, flexible polyurethane foams, for example, were produced. The test stabilizers and stabilizer combinations were tested in two different formulations, characterized below as formulation A and formulation B. Formulation A is critical in particular in respect of the stabilizing properties of a stabilizer. In connection with the use of formulation A, the characteristic variable is the settling that is obtained in the course of foaming, at the end of the rise phase. This settling indicates how far a foam slab falls back, i.e. loses height, after the opening of the cells that is necessary in flexible slabstock foam, and is therefore an expression of the volume which can be achieved in the course of foaming. In the case of comparable open-cell content, therefore, particularly low settling rates are desirable, since in this case the resulting foam volume is increased. Formulation B, on the other hand, is critical in terms of the number of cells per centimeter present in this foam and is therefore a measure of the nucleation capability of the foam stabilizer/foam stabilizer combination used. In this context, especially in view of new technological processes, such as foaming with liquid $CO_2$, high cell counts, i.e., fine uniform foams, are advantageous.

For formulation A, 12 parts of water, 9 parts of a physical blowing agent, the stated amount of foam stabilizer component to be tested, 0.33 part of triethylenediamine and 0.6 part of tin octoate were added with thorough mixing to 300 parts of a conventional commercial polyether for the production of flexible polyurethane foams, which carried on average 3 OH groups for a molecular weight of 3500 g/mol. Following the addition of 125 parts of toluene diisocyanate (a 4:1 mixture of the 2,4 and 2,6 isomers), the mixture was mixed thoroughly using a stirrer at 3000 rpm for 7 seconds and is poured into a box. The resulting foam was used to determine the data below.

The stabilizers used are all commercially available products from Th. Goldschmidt AG, Essen, which can be classified into the above-described groups of Si—C or Si—O—C stabilizers as follows:

Si—O—C: Tegostab® B 4900, Tegostab® 8040
Si—C: Tegostab® B 8240, Tegostab® B 8220

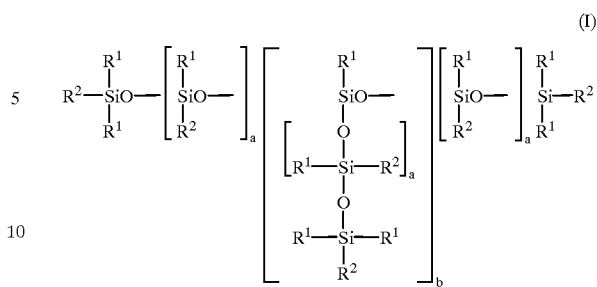

in which the radicals $R^1$ are alkyl radicals or aryl radicals, $R^2$ are $R^1$ and/or $R^3$ and/or $R^4$ wherein at least one $R^2$ is not $R^1$, $R^3$ is a polyether radical of the formula II
—$(Y)_e$, $[O(C_2H_{4-d}R'_dO)_m(C_xH_{2x}O)_pZ]_w$, with the proviso that $e=0$ or 1, $w=1$ to 4,

| Stabilizer | Settling in formulation A [cm], 0.8 part per 100 parts of polyol | Cell count in formulation B [cells per cm] at concentration [pphp = parts per 100 of polyol] | Status (inventive or non-inventive) |
|---|---|---|---|
| Tegostab ® B 4900 | 2.4 | 7 at 0.6 pphp | non-inventive |
| Tegostab ® B 8040 | 1.0 | 5 at 0.6 pphp | non-inventive |
| Tegostab ® B 8240 | 0.6 | 7 at 0.6 pphp | non-inventive |
| Mixture of Tegostab ® B4900 and Tegostab ® B8240, ratio 1:1 | 1.1 | 10 at 0.6 pphp | inventive |
| Mixture of Tegostab ® B8040 and Tegostab ® B8240, ratio 1:1 | 0.8 | 11 at 0.6 pphp | inventive |
| Tegostab ® B4900 | 2.4 | 1 0 at 1.0 pphp | non-inventive |
| Tegostab ® B8220 | 0.2 | 12 at 1.0 pphp | non-inventive |
| Tegostab ® B8240 | 0.6 | 12 at 1.0 pphp | non-inventive |
| Mixture of Tegostab ® B4900 and Tegostab ® B8220, ratio 1:1 | 0.8 | 13 at 1.0 pphp | inventive |
| Mixture of Tegostab ® B4900 and Tegostab ® B8240, ratio 1:1 | 1.1 | 13 at 1.0 pphp | inventive |

The comparison clearly shows that the novel additive combinations make it possible under comparable conditions to achieve improved properties, in respect of the cell structure, for example, relative to the individual components from the group of Si—C or Si—O—C copolymers respectively. The levels of properties that are possible by the combination of the classes of substance are obviously not simply the arithmetic mean of the results of the individual components.

The above description is intended to be illustrative and not limiting. Various changes and modifications in the embodiments may occur to those skilled in the art. These changes can be made without departing from the scope of the invention.

What is claimed is:

1. A composition for making a polyurethane foam comprising the polymer reactants for making said foam including a foam stabilizer which comprises a mixture of at least two organically modified polysiloxanes of the formula $d=1$ to 3, $m \geq 1$, $x=2$ to 4, obtainable by using $C_2H_4O$, $C_3H_6O$ and $C_4H_8O$ units either individually or in combination, and $p \geq 1$, and Y is a (w+1)-valent hydrocarbon radical, which can also be branched, R' is selected from the group consisting of monovalent aromatic or nonaromatic hydrocarbon radicals from $C_3$ to $C_{18}$, Z is hydrogen or a monovalent organic radical, the sum $m+p=1$ to 150, $R^4$ is a polyether radical of the formula III
—$(F)_f[O(C_xH_{2x}O)_rZ]_g$, with the proviso that $f=0$ or 1, $x=2$ to 4, obtainable by using $C_2H_4O$, $C_3H_6O$ and $C_4H_8O$ units either individually or in combination, g=1 to 4 and r≧1, F is a (g+1)-valent hydrocarbon radical, which can also be branched, a is a number from 1 to 100 if b is a number from 6 to 8, a is a number from 1 to 200 if b is a number from 3 to 6, a is a number from 1 to 300 if b is a number from 0 to 3, b=0 to 8, subject to the condition that in at least one of the silicone copolymer components of the mixture both e and f are 1 and in at least one of the silicone components of the mixture either e or f is 0.

2. A composition according to claim 1, which further comprises a surface-active agent.

3. A process for preparing polyurethane foams which comprises reacting the reactants of claim 1.

4. The process according to claim 3, which further comprises adding a liquid pressurized gas as a blowing agent.

* * * * *